United States Patent [19]

Biamino

[11] Patent Number: 4,785,918
[45] Date of Patent: Nov. 22, 1988

[54] PNEUMO-HYDRAULIC CONVERTER FOR DISC BRAKE CALLIPERS

[75] Inventor: Franco Biamino, Collegno, Italy

[73] Assignee: Iveco Fiat S.A., Turin, Italy

[21] Appl. No.: 942,106

[22] Filed: Dec. 16, 1986

[30] Foreign Application Priority Data

Mar. 6, 1986 [IT] Italy ............... 53077/86[U]

[51] Int. Cl.⁴ .............. F16D 55/18; B60T 11/00; B60T 11/28; F15B 7/00
[52] U.S. Cl. .................. 188/72.4; 60/583; 60/589; 188/370
[58] Field of Search .......... 188/71.7, 72.3, 72.4, 188/72.1, 370, 151 R, 152, 153 D, 153 A, 347; 60/593, 589, 565, 574, 547.1, 583, 585, 592; 192/85 AA, 8 R, 101

[56] References Cited

U.S. PATENT DOCUMENTS

| 3,395,535 | 8/1968 | Morris | 188/153 A X |
|---|---|---|---|
| 3,981,148 | 9/1976 | McLuckie | 60/574 |
| 4,288,987 | 9/1981 | Grullmeier | 60/593 X |
| 4,319,457 | 3/1982 | Gross et al. | 60/593 |
| 4,471,614 | 9/1984 | Hart | 60/585 X |
| 4,509,330 | 4/1985 | Zimber et al. | 60/593 X |
| 4,553,644 | 11/1985 | Folch | 188/72.4 |
| 4,653,272 | 3/1987 | Sibeud et al. | 60/593 X |

FOREIGN PATENT DOCUMENTS 3441802 5/1986 Fed. Rep. of Germany ..... 188/72.4

Primary Examiner—Andres Kashnikow
Assistant Examiner—Robert J. Oberleitner
Attorney, Agent, or Firm—Sughrue, Mion, Zinn, Macpeak & Seas

[57] ABSTRACT

Pneumo-hydraulic converter for disc brake callipers, particularly for commercial vehicles, comprising a body intended for application directly to a brake calliper or in the immediate vicinity thereof and having a central axis cavity in which there is sealingly slidable a first piston to which is fixed a second piston sealingly slidable in a pneumatic chamber formed at one end of the body and connected at one end to a pressurized air supply and containing a biassing spring for the first and second pistons at its opposite end. The first piston is operatively associated with a hydraulic chamber formed at the other end of the body and defined by a hollow slider guided axially within the body and intended to operate the brake calliper, and the hydraulic chamber is connected to a hydraulic fluid reservoir.

2 Claims, 1 Drawing Sheet

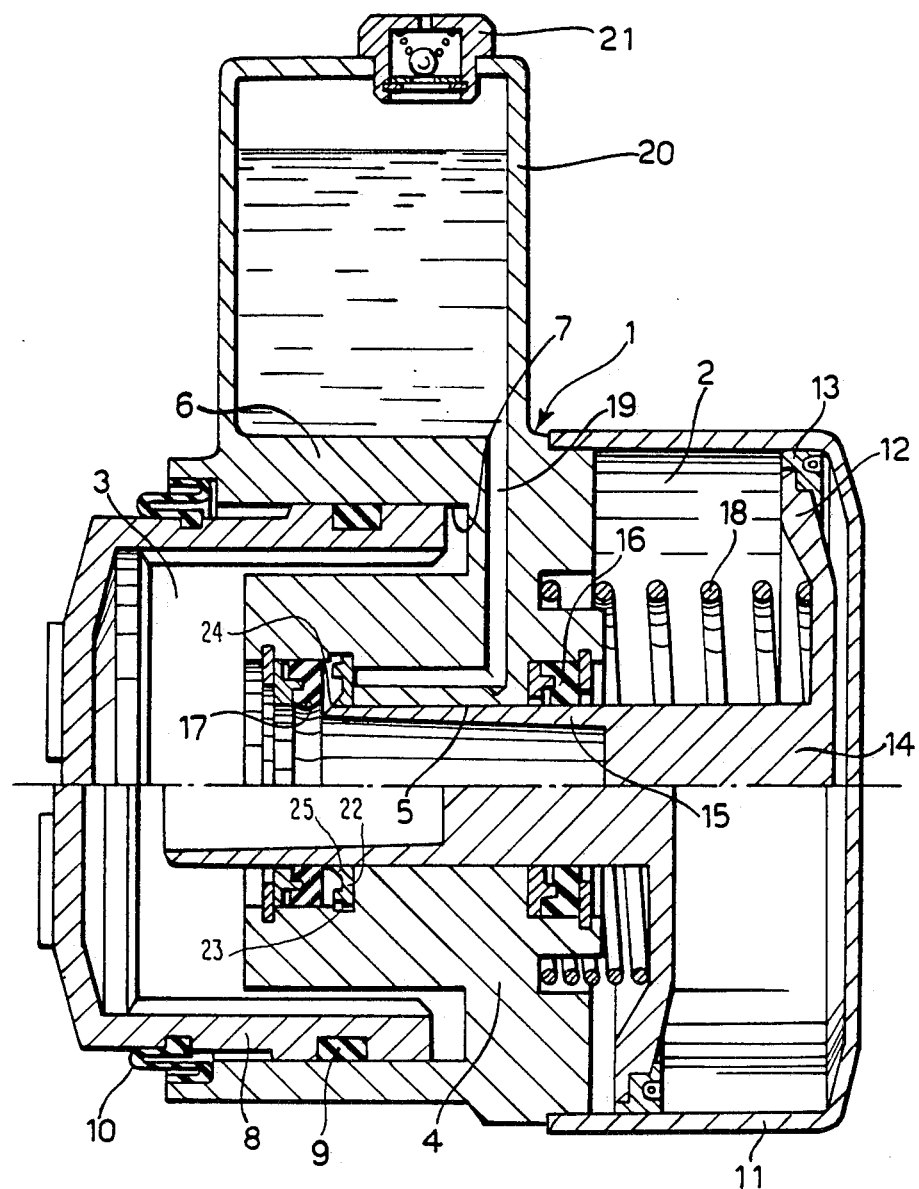

PNEUMO-HYDRAULIC CONVERTER FOR DISC BRAKE CALLIPERS

BACKGROUND OF THE INVENTION

The present invention relates to pneumo-hydraulic converters for disc brake callipers.

SUMMARY OF THE INVENTION

The object of the present invention is to provide a converter having a simple and compact shape with extremely small dimensions such as to allow its installation directly on the brake calliper or in the immediate vicinity of the wheel associated with the calliper.

In order to achieve this object, the present invention provides a pneumo-hydraulic converter characterised in that it includes a body intended for application directly to a brake calliper or in the immediate vicinity thereof and having a central axial cavity in which there is sealingly slidable a first piston to which is fixed a second piston sealingly slidable in a pneumatic chamber formed at one end of the body and connected at one end to a pressurized air supply and containing a biassing spring for the first and second pistons at its opposite end; the first piston being operatively associated with a hydraulic chamber formed at the other end of the body and defined by a hollow slider guided axially within the body and intended to operate a friction pad; the hydraulic chamber being connected to a hydraulic fluid reservoir.

To advantage, the hydraulic chamber is connected to the hydraulic fluid reservoir through a passage formed in the body.

BRIEF DESCRIPTION OF THE DRAWING

The invention will now be described in detail with reference to the appended drawing which illustrates a pneumo-hydraulic converter according to the invention in axial section.

DETAILED DESCRIPTION OF THE INVENTION

With reference to the drawing, the pneumo-hydraulic converter according to the invention comprises essentially a body 1 intended for application directly to a disc brake calliper or in the immediate vicinity thereof, and forming a pneumatic chamber 2 at one end and a hydraulic chamber 3 at the other end.

In effect, the body 1 has a generally cylindrical shape with an inner central part 4 having an axial through cavity 5, and an internal axial skirt 6 which defines an annular recess 7 together with the inner part 4. This annual recess 7 acts as a guide for a cup-shaped slider 8 which defines the hydraulic chamber 3 at one end and is slidable along the inner surface of the skirt 6, being sealed by an annular washer 9. The slider 8, which is connected to the free edge of the skirt 6 by a flexible bellows member 10, is intended to operate the friction pad for braking the disk.

The pneumatic chamber 2 is defined by a cup-shaped member 11 fixed to the base of the body 1 at the opposite end from the skirt 6. In this pneumatic chamber 2 there is sealingly slidable a piston 12 having a peripheral sealing washer 13 and fixed to a rod 14 which, at its end opposite the piston 12, itself forms a piston 15 slidable along the axial cavity 5 of the body and sealed by means of annular washers 16, 17.

The zone of the pneumatic chamber 2 between the piston 12 and the bottom of the cup-shaped member 11 is arranged to be put into communication with a compressed air supply of a conventional braking system through a passage, not shown. The other end of the pneumatic chamber 2 contains a helical compression spring 18 which reacts against the base of the body 1 and biasses the piston 12, together with the rod 14 and the hollow piston 15, towards the bottom of the cup-shaped member 11.

The hydraulic chamber 3 is filled with hydraulic fluid which comes from a supply and compensating circuit including a reservoir 20 connected to the chamber 3 by means of a passage 19 formed directly within the body 1. An annular ring 22 is provided between the sealing washer 17 and the end of the passage 19 to retain the sealing washer 17 axially of the assembly. The annular ring 22 is provided with at least one peripheral axial groove 23 and at least one radial opening 24 in the conical hub 25 which permits passage of hydraulic fluid from the reservoir 20 to the chamber 3. In the embodiment illustrated, the reservoir 20 is formed integrally with the skirt 6 of the body 1. The reservoir 20 may be in direct communication with the exterior or, as in the embodiment illustrated, kept under pressure by means of a cut-off valve 21.

Alternatively, the reservoir 20 could be separate and fixed to the calliper of the brake.

In operation, the compressed air introduced into the pneumatic chamber causes the piston 12, with the rod 14 and the hollow piston 15, to move towards the left in the drawing. As a result of this movement, illustrated in the lower part of the drawing, the hydraulic fluid in the hydraulic chamber 3 thrusts the slider 8 in the same direction, causing the friction pad to approach the disc.

The return to the initial position illustrated in the upper part of the drawing is achieved by the action of the helical spring 18.

In this position, the supply circuit for the hydraulic fluid, which is connected to the chamber 3 through the passage 19, allows the regular refilling of the chamber 3 to be maintained and compensates for any variations in volume of the chamber 3 due to temperature variations and progressive wear of the friction pads.

It is to be pointed out that, the hydraulic chamber 3 could be defined by a wall fixed to the body 1 instead of by the slider 8: in this case, suitable channels would be provided in this body for operating two or more movable sliders.

I claim:

1. A pneumo-hydraulic converter for disc brake callipers, particularly for commercial vehicles, comprising a body intended for application directly to a disc brake calliper and having a first end, a second end and a central axial cavity, a first piston sealingly slidable within the cavity of said body, a pneumatic chamber adapted to be connected to a pressurized air supply is formed at the first end of said body, a second piston sealingly slidable in said chamber and fixed to said first piston, return spring means for the first and second pistons contained within said chamber between the first end of said body and said second piston, a hollow slider guided axially within said body between an operative position for operating said brake calliper and an inoperative position, said slider defining a hydraulic chamber formed at the second end of said body and in which said first piston is operatively associated, hydraulic fluid reservoir means operatively associated with said body and having cut-off valve means for communicating the reservoir means with the atmosphere for keeping said reservoir under pressure and a passage formed in said body for connecting said hydraulic chamber to said reservoir means, adjacent said cavity whereby communication between said hydraulic chamber and said passage is controlled by movement of said first piston in said cavity so as to provide communication from said reservoir means to said chamber only in the inoperative position of said hollow slider when said second piston attached to said first piston is biased by said return spring means to a position in said pneumatic chamber remote from said first end of said body.

2. A converter as set forth in claim 1 wherein said reservoir means is formed integrally with said body.

* * * * *